United States Patent
Koplow

(10) Patent No.: US 8,094,689 B1
(45) Date of Patent: Jan. 10, 2012

(54) LASER SYSTEMS CONFIGURED TO OUTPUT A SPECTRALLY-CONSOLIDATED LASER BEAM AND RELATED METHODS

(75) Inventor: Jeffrey P. Koplow, San Ramon, CA (US)

(73) Assignee: Sandia Corporation, Livermore, CA (US)

( * ) Notice: Subject to any disclaimer, the term of this patent is extended or adjusted under 35 U.S.C. 154(b) by 438 days.

(21) Appl. No.: 12/184,499

(22) Filed: Aug. 1, 2008

(51) Int. Cl.
*H01S 3/30* (2006.01)
*H01S 3/082* (2006.01)

(52) U.S. Cl. ............................................. 372/3; 372/97
(58) Field of Classification Search .............. 372/3, 97, 372/99, 101
See application file for complete search history.

(56) References Cited

U.S. PATENT DOCUMENTS 6,411,323 B1 * 6/2002 Waarts et al. ................. 347/241
6,813,302 B1 * 11/2004 Stoneman et al. .............. 372/75
* cited by examiner

*Primary Examiner* — Armando Rodriguez
(74) *Attorney, Agent, or Firm* — Workman Nydegger

(57) ABSTRACT

A laser apparatus includes a plurality of pumps each of which is configured to emit a corresponding pump laser beam having a unique peak wavelength. The laser apparatus includes a spectral beam combiner configured to combine the corresponding pump laser beams into a substantially spatially-coherent pump laser beam having a pump spectrum that includes the unique peak wavelengths, and first and second selectively reflective elements spaced from each other to define a lasing cavity including a lasing medium therein. The lasing medium generates a plurality of gain spectra responsive to absorbing the pump laser beam. Each gain spectrum corresponds to a respective one of the unique peak wavelengths of the substantially spatially-coherent pump laser beam and partially overlaps with all other ones of the gain spectra. The reflective elements are configured to promote emission of a laser beam from the lasing medium with a peak wavelength common to each gain spectrum.

19 Claims, 5 Drawing Sheets

LASER SYSTEMS CONFIGURED TO OUTPUT A SPECTRALLY-CONSOLIDATED LASER BEAM AND RELATED METHODS

STATEMENT REGARDING RESEARCH AND DEVELOPMENT

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

BACKGROUND

Laser is an acronym for "Light Amplification by Stimulated Emission of Radiation." The term laser refers generally to a category of optical devices that emit a spatially and temporally coherent beam of light otherwise known as a laser beam. There are a variety of different types of lasers, such as electrically-pumped semiconductor lasers, optically-pumped solid-state lasers (e.g., a laser using a sapphire crystal as a lasing medium), and optical fiber lasers.

Lasers have found great utility in a number of different applications, such as optical communications, welding, materials processing, and surgical applications because of the unique optical characteristics of a laser beam. For example, a laser beam typically exhibits one or more of the following desirable characteristics: (1) a very narrow bandwidth; (2) an ability to propagate over long distances without significant divergence; and (3) and an ability to be focused to a very small beam diameter.

In many applications, it is desirable to increase the power of a laser beam by power scaling. Power scaling entails combining the output power of multiple individual laser sources into a single high-power beam of beam quality comparable to that of the individual laser sources.

One power-scaling technique for combining multiple high-power laser beams is spectral beam combining, which is also commonly known as wavelength beam combining, wavelength combining, or incoherent beam combining. In spectral beam combining, respective high-power laser beams with non-overlapping optical spectra are combined using a spectral beam combiner (also known as a wavelength-selective beam combiner), such as a prism, or more commonly, a diffraction grating. The spectral beam combiner directs each respective high-power laser beam according to their peak wavelengths so that the directed laser beams propagate in generally the same direction as a single, substantially spatially-coherent beam.

While spectral beam combining is an effective beam combining technique, it suffers from an intrinsic limitation with regard to scalability. The number of laser beams of different peak wavelengths that can be spectrally combined is determined by the bandwidth of the laser gain medium (e.g., 1045 to 1090 nm for a typical Yb-doped fiber amplifier) and the minimum allowable spacing between adjacent wavelengths. The minimum allowable spacing between adjacent wavelengths is determined by the resolving power of the wavelength-dispersive element of the spectral beam combiner and the physical size of the spectral beam combiner. For example, if the minimum allowable wavelength in a spectral beam combiner is 10 nm, then five separate laser beams output from respective Yb-doped fiber lasers operating at 1050, 1060, 1070, 1080 and 1090 nm can be spectrally combined into a single, spatially-coherent laser beam. However, the resulting combined laser beam is unsuitable for further spectral beam combining. For example, two identical spectrally-combined laser beams cannot be spectrally beam combined because they are not spectrally distinct. In addition, it would not be possible to spectrally beam combine such a spectrally-combined laser source with a second spectrally beam combined source having a spectrum including intermediate wavelengths of 1045, 1055, 1065, 1075, and 1085 nm because the minimum wavelength spacing specification of 10 nm would be violated. Thus, it is not possible to perform multiple stages of spectral beam combining. Furthermore, the number of emitters that can be combined using spectral beam combining is limited accordingly.

Coherent beam combining is another technique for combining multiple laser beams. In coherent beam combining, multiple high-power laser beams can be combined into a single laser beam using the well-known side-by-side combining and filled-aperture combining techniques. While coherent beam combining preserves the spectral bandwidth from the multiple high-power laser beams, the technique requires precise control of the phase and polarization of each of the multiple high-power laser beams. Therefore, laser apparatuses employing coherent beam combining can be very complicated and difficult to operate efficiently in practical applications outside of a laboratory.

SUMMARY

Embodiments of the invention relate to laser apparatuses configured to output a spectrally-consolidated laser beam and power-scalable laser systems that use a plurality of such laser apparatuses. Spectral consolidation is a process in which a substantially spatially-coherent beam with a relatively broad wavelength spectrum is converted into a substantially spatially-coherent beam with a relatively narrow wavelength spectrum, and a spectrally-consolidated beam is a beam generated by spectral consolidation.

In an embodiment, a laser apparatus includes a plurality of pumps. Each pump is configured to emit a corresponding pump laser beam having a unique peak wavelength. The laser apparatus further includes a spectral beam combiner configured to combine the corresponding pump laser beams into a substantially spatially-coherent pump laser beam having a pump spectrum that includes the unique peak wavelengths. The laser apparatus also includes first and second selectively reflective elements spaced from each other to define a lasing cavity including a lasing medium positioned therein. The lasing medium generates a plurality of gain spectra responsive to absorbing the substantially spatially-coherent pump laser beam. Each gain spectrum corresponds to a respective one of the unique peak wavelengths of the substantially spatially-coherent pump laser beam and partially overlaps with all other ones of the gain spectra. The first and second selectively reflective elements are configured to promote emission of a laser beam from the lasing medium with a lasing peak wavelength common to each gain spectrum. In an embodiment, the lasing medium may comprise a Raman lasing medium and the gain spectra may comprise Raman gain spectra.

In another embodiment, a scalable laser system includes a set of laser apparatuses, with each laser apparatus including a lasing cavity having a lasing medium positioned therein. Each laser apparatus is configured to emit a corresponding spectrally-consolidated laser beam at a unique lasing peak wavelength responsive to the lasing medium thereof absorbing a corresponding spectrally-combined, substantially spatially-coherent pump laser beam. The lasing system further includes a spectral beam combiner configured to combine the corresponding spectrally-consolidated laser beams into a higher-stage substantially spatially-coherent pump laser beam.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to laser apparatuses configured to output a spectrally-consolidated laser beam and power-scalable laser systems that use a plurality of such laser apparatuses. One or more of the disclosed embodiments are directed to a laser apparatus configured to generate a spectrally-consolidated laser beam having a lasing peak wavelength that is common to a plurality of partially overlapping gain spectra generated in a lasing medium responsive to the lasing medium absorbing a spectrally-combined pump laser beam. For example, in an embodiment, the lasing medium may comprise a Raman lasing medium and the gain spectra may comprise Raman gain spectra.

Figure 1:
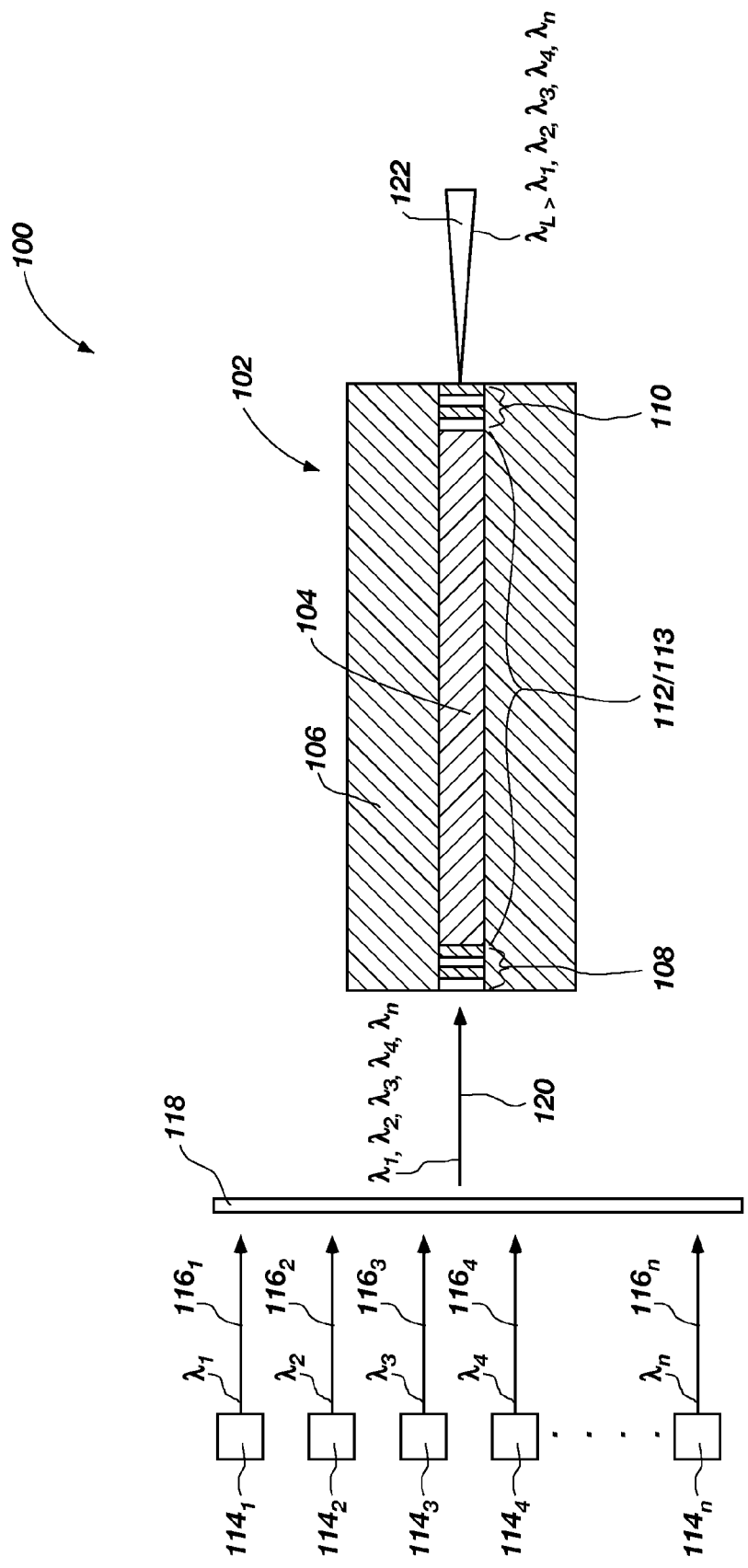
FIG. 1 is a diagrammatic view of an embodiment of a laser apparatus configured to output a spectrally-consolidated laser beam.

FIG. 1 is a diagrammatic view of an embodiment of a laser apparatus 100 configured to output a spectrally-consolidated laser beam. The laser apparatus 100 includes a Raman fiber laser 102 (e.g., a silica-based, single-mode, single-clad or double clad optical fiber or other suitable waveguide) having a core 104 surrounded by at least one higher refractive-index cladding layer 106 configured to guide electromagnetic radiation within the core 104. The core 104 may include first and second selectively reflective elements 108 and 110 formed therein and spaced from each other to define a lasing cavity 112. For example, each of the first and second spaced selectively reflective elements 108 and 110 may be a fiber Bragg grating that may be formed in the core 104 by selectively exposing the core 104 to ultraviolet radiation to selectively modulate the refractive index of the core 104. Thus, in the illustrated embodiment, the portion of the core 104 positioned within the lasing cavity 112 defined by the first and second selectively reflective elements 108 and 110 functions as a Raman lasing medium 113 (i.e., a lasing medium). In other embodiments, respective ends of the Raman fiber laser 102 may be coated with wavelength-selective reflectors formed by a deposition process, such as physical and/or chemical vapor deposition, instead of, or in addition to, using fiber Bragg gratings.

The laser apparatus 100 further includes a plurality of pumps $114_1$-$114_n$, each of which is configured to emit a corresponding pump laser beam $116_1$-$116_n$ having a corresponding unique peak wavelength $\lambda_1$-$\lambda_n$. For example, each pump laser beam $116_1$-$116_n$ may have a narrow bandwidth approximately centered about a corresponding unique peak wavelength $\lambda_1$-$\lambda_n$.

The laser apparatus 100 also includes a spectral beam combiner 118 configured to combine the pump laser beams $116_1$-$116_n$ into a single, spectrally-combined, substantially spatially-coherent pump laser beam 120 having a pump spectrum 200 (FIG. 2) that includes the unique peak wavelengths $\lambda_1$-$\lambda_n$. Each of the first and second selectively reflective elements 108 and 110 is configured to be substantially transparent to the substantially spatially-coherent pump laser beam 120 over all or part of the pump spectrum 200 thereof. In another embodiment, the selective reflective element 110 may be highly-reflective over all or part of the pump spectrum 200 of the substantially spatially-coherent pump laser beam 120 to thereby provide for double-pass absorption of the substantially spatially-coherent pump laser beam 120 by the Raman lasing medium 113.

Figure 2:
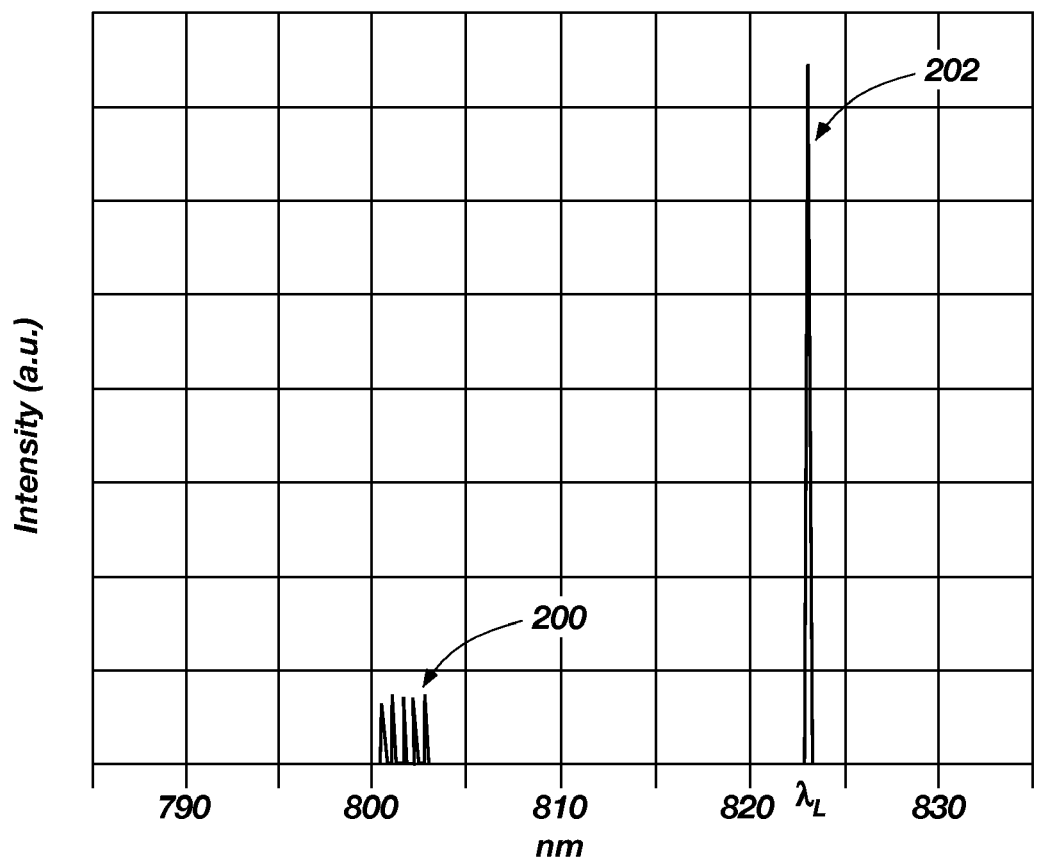
FIG. 2 is a graph of the pump spectrum and lasing spectrum output from the lasing cavity shown in FIG. 1.

FIG. 2 is a graph of an example of the pump spectrum 200 for the substantially spatially-coherent pump laser beam 120 shown in FIG. 1. The pump spectrum 200 of the substantially spatially-coherent pump laser beam 120 may include discrete non-overlapping spectra, which correspond to the spectrums of each pump laser beam $116_1$-$116_n$ output by the corresponding pumps $114_1$-$114_n$ that form the substantially spatially-coherent pump laser beam 120.

Referring again to FIG. 1, in an embodiment, the spectral beam combiner 118 may be a refractive element (e.g., a prism) configured to combine the pump laser beams $116_1$-$116_n$ into the substantially spatially-coherent pump laser beam 120. In another embodiment, the spectral beam combiner 118 may be a diffractive element (e.g., a diffraction grating) configured combine the pump laser beams $116_1$-$116_n$ into the substantially spatially-coherent pump laser beam 120. In either embodiment, the spectral beam combiner 118 directs each respective pump laser beam $116_1$-$116_n$ according to their unique peak wavelengths $\lambda_1$-$\lambda_n$ so that the directed pump laser beams $116_1$-$116_n$ propagate in generally the same direction as the substantially spatially-coherent pump laser beam 120.

In some embodiments, one or more of the pumps $114_1$-$114_n$ may be configured as a laser diode. For example, the pumps $114_1$-$114_n$ may form an array of laser diodes, with each laser diode configured to emit a corresponding pump laser beam $116_1$-$116_n$. Each laser diode may be associated with a microlens or other optical element that is configured to direct a corresponding one of the pump laser beams $116_1$-$116_n$ to the spectral beam combiner 118 at a selected incident angle chosen so that the substantially spatially-coherent pump laser beam 120 is generated when the pump laser beams $116_1$-$116_n$ are diffracted or refracted by the spectral beam combiner 118. In other embodiments, the pump laser beams $116_1$-$116_n$ output from the pumps $114_1$-$114_n$ may be passed through a common transfer lens (not shown). In other embodiments, one or more of the pumps $114_1$-$114_n$ may be configured as fiber laser or another suitable type of laser.

Although not shown, any suitable apparatus may be used to introduce the substantially spatially-coherent pump laser beam 120 into the core 104 of the Raman fiber laser 102. For example, the substantially spatially-coherent pump laser beam 120 may be introduced into the core 104 by collimating the substantially spatially-coherent pump laser beam 120 to a sufficiently small beam size using one or more collimating lenses.

In operation, each pump $114_1$-$114_n$ outputs a corresponding pump laser beam $116_1$-$116_n$ that is spectrally combined by the spectral beam combiner 118 to generate the substantially spatially-coherent pump laser beam 120 having the pump spectrum 200 (FIG. 2) that includes the unique peak wavelengths $\lambda_1$-$\lambda_n$. The substantially spatially-coherent pump laser beam 120 may be transmitted through the first selectively reflective element 108 and absorbed by the Raman lasing medium 113.

Figure 3:
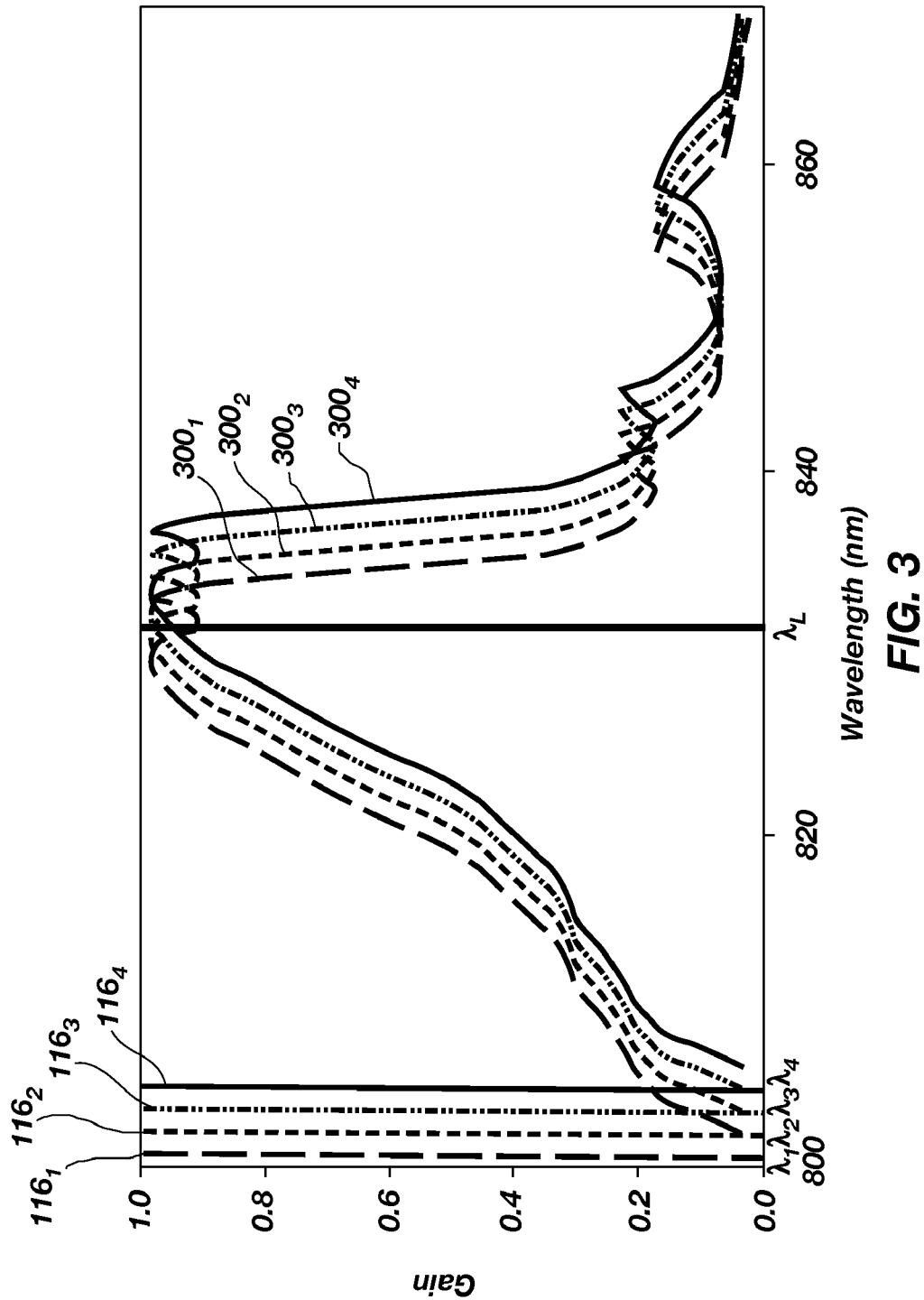
FIG. 3 is a graph of partially overlapping Raman gain spectra generated by the Raman lasing medium shown in FIG. 1 responsive to absorbing the spectrally-combined pump laser beam shown in FIG. 1.

Referring to FIG. 3, the Raman lasing medium 113 converts at least a portion of the absorbed substantially spatially-coherent pump laser beam 120 by a stimulated Raman down-converting scattering process responsive to absorbing the substantially spatially-coherent pump laser beam 120. A plurality of Raman gain spectra $300_1$-$300_n$ are generated by and within the Raman lasing medium 113. Each Raman gain spectrum $300_1$-$300_n$ is generated by the absorption of the corresponding pump laser beam $116_1$-$116_n$ that forms part of the spectrally-combined, substantially spatially-coherent pump laser beam 120. For example, the Raman gain spectrum $300_1$ is generated by absorption of the portion of the spectrally-combined, substantially spatially-coherent pump laser beam 120 provided by the pump laser beam $116_1$, the Raman gain spectrum $300_2$ is generated by absorption of the portion of the spectrally-combined, substantially spatially-coherent pump laser beam 120 provided by the pump laser beam $116_2$, etc. The characteristics of the Raman gain spectra $300_1$-$300_n$ are determined, primarily, by the composition of the Raman lasing medium 113 and the unique peak wavelengths $\lambda_1$-$A_n$ of the pump laser beams $116_1$-$116_n$ output by the pumps $114_1$-$114_n$.

Still referring to FIG. 3, the first selectively reflective element 108 is configured to be substantially reflective (e.g., about one-hundred percent reflective) to electromagnetic radiation at a wavelength $\lambda_L$ and the second selectively reflective element 110 is configured to be partially reflective (e.g., about eighty-five percent reflective) to electromagnetic radiation at the wavelength $\lambda_L$ so that electromagnetic radiation at the wavelength $\lambda_L$ may be transmitted therethrough. The wavelength $\lambda_L$ is common to all of the Raman gain spectra $300_1$-$300_n$. Due to the selectivity of the first and second selectively reflective elements 108 and 110 to reflect electromagnetic radiation at the wavelength $\lambda_L$, emission of electromagnetic radiation at the wavelength $\lambda_L$ is promoted, and a spectrally-consolidated laser beam 122 with a narrow bandwidth compared to the substantially spatially-coherent pump laser beam 120 and a lasing peak wavelength $\lambda_L$ is output through and out of the Raman lasing medium 113. An example of a lasing spectrum for the spectrally-consolidated laser beam 122 is shown in FIG. 2 as lasing spectrum 202.

Referring again to FIG. 3, explaining further, there is a certain probability that some photons from the absorbed substantially spatially-coherent pump laser beam 120 are scattered by the Raman lasing medium 113 via stimulated Raman scattering at the wavelength $\lambda_L$. Because the first and second selectively reflective elements 108 and 110 are reflective to such photons at the wavelength $\lambda_L$, further Raman scattering of the absorbed substantially spatially-coherent pump laser beam 120 by the Raman lasing medium 113 is stimulated at the wavelength $\lambda_L$ to promote lasing at the lasing peak wavelength $\lambda_L$ as the spectrally-consolidated laser beam 122. Thus, the Raman lasing medium 113 is capable of extracting energy from each Raman gain spectrum $300_1$-$300_n$ and outputting the spectrally-consolidated laser beam 122 at the lasing peak wavelength $\lambda_L$ common to each Raman gain spectrum $300_1$-$300_n$. The lasing peak wavelength $\lambda_L$ of the spectrally-consolidated laser beam 122 may be tuned by varying the respective unique peak wavelengths $\lambda_1$-$\lambda_n$ of the pump laser beams $116_1$-$116_n$ and/or the wavelength selectivity of the first and second selectively reflective elements 108 and 110.

It is noted that although the illustrated embodiment for the laser apparatus 100 employs a portion of the core 104 as the Raman lasing medium 113, other optical gain media may be used. For example, in another embodiment, a Raman gain medium (e.g., a silica layer) may be part of an integrated optical waveguide formed on a substrate. In another embodiment, a Raman gain medium may be a bulk piece of substantially transparent material (e.g., a block of fused silica) of a selected composition disposed within a lasing cavity defined by spaced selectively reflective elements.

Figure 4:
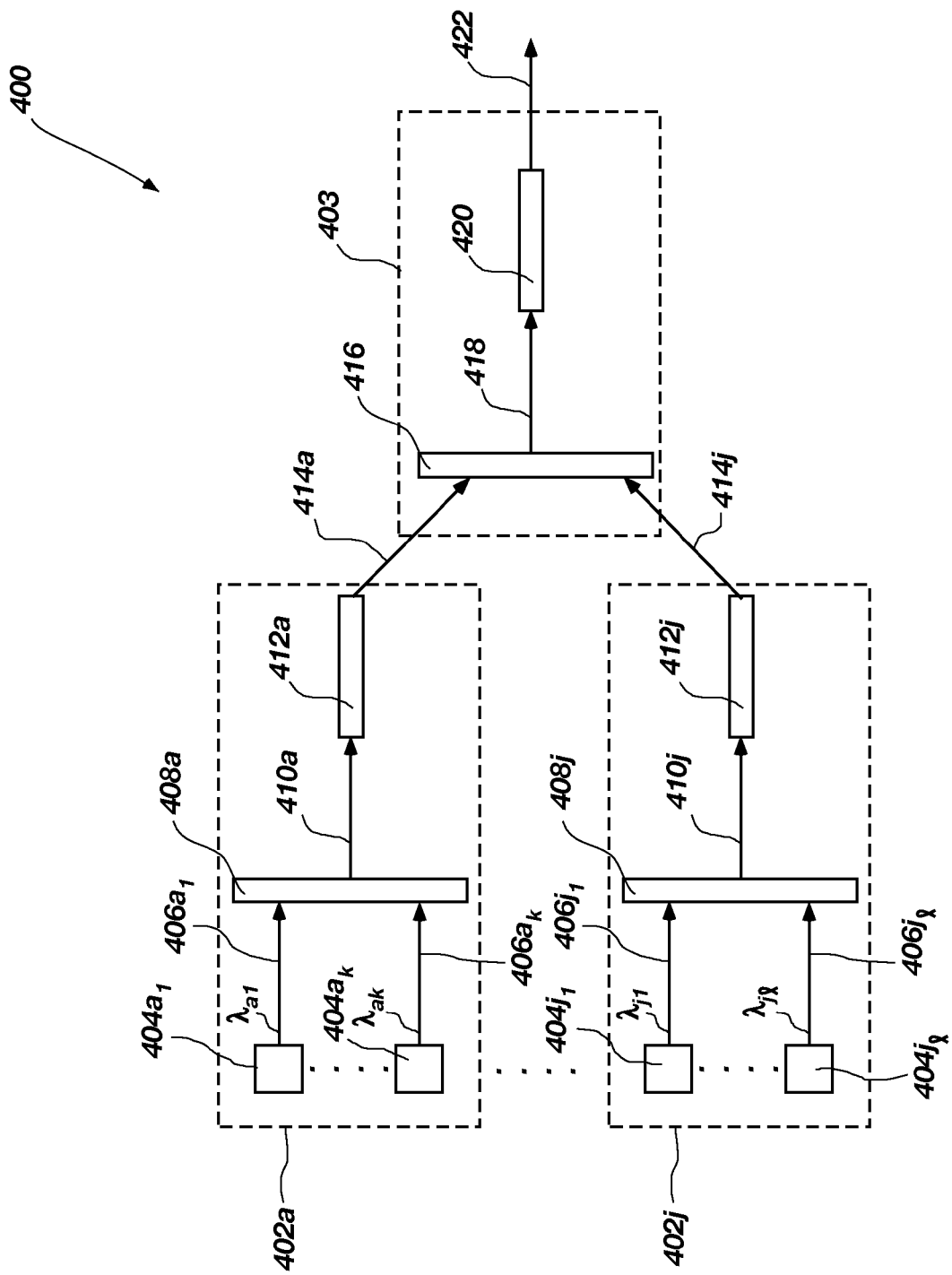
FIG. 4 is a diagrammatic view of an embodiment of a power-scalable laser system that uses a plurality of the laser apparatuses shown in FIG. 1.

FIG. 4 is a diagrammatic view of an embodiment of a power-scalable laser system 400 having a scalable tree-like topology that uses a plurality of laser apparatuses, each of which may be configured as any of the laser apparatus embodiments disclosed herein. The power of a laser beam output by the laser system 400 may be increased, without deleteriously increasing the complexity of the laser system 400, by repeatedly spectrally consolidating previously spectrally-consolidated laser beams output by such laser apparatuses.

The laser system 400 includes a first set having an arbitrary number of laser apparatuses 402a-402j, each which may be configured according to any of the laser apparatus embodiments disclosed herein (e.g., the laser apparatus 100). The laser apparatus 402a includes a plurality of pumps $404a_1$-$404a_k$. Each pump $404a_1$-$404a_k$ of the laser apparatus 402a is configured to emit a corresponding pump laser beam $406a_1$-$406a_k$ having a corresponding unique peak pump wavelength $\lambda_{a1}$-$\lambda_{ak}$. The pump laser beams $406a_1$-$406a_k$ may be spectrally combined using a lower-stage spectral beam combiner 408a (e.g., a diffraction grating or prism), as previously described, to form a lower-stage, spectrally-combined, substantially spatially-coherent pump laser beam 410a. The substantially spatially-coherent pump laser beam 410a may be spectrally consolidated, as previously described, by absorption thereof by a core (i.e., Raman gain medium) of a Raman fiber laser 412a to form a spectrally-consolidated laser beam 414a. The lasing peak wavelength of the spectrally-consolidated laser beam 414a may be controlled by the composition of the Raman gain medium, the selective reflectivity of reflective elements (not shown) that define the lasing cavity of the Raman fiber laser 412a, and/or the pump spectrum of the spatially-coherent pump laser beam 410a.

The laser apparatus 402j also includes a plurality of pumps $404j_1$-$404j_k$. Each pump $404j_1$-$404j_l$ of the laser apparatus 402j is configured to emit a corresponding pump laser beam $406j_1$-$406j_l$ having a corresponding unique peak pump wavelength $\lambda_{j1}$-$\lambda_{jl}$. The pump laser beams $406j_1$-$406j_l$ may be spectrally combined using a lower-stage spectral beam combiner 408j (e.g., a diffraction grating or prism), as previously described, to form a lower-stage, spectrally-combined, substantially spatially-coherent pump laser beam 410j. The substantially spatially-coherent pump laser beam 410j may be spectrally consolidated, as previously described, by absorption thereof by a core (i.e., Raman gain medium) of a Raman fiber laser 412j to form a spectrally-consolidated laser beam 414j that has a unique lasing peak wavelength different than that of the spectrally-consolidated laser beam 414a. The lasing peak wavelength of the spectrally-consolidated laser beam 414j may be controlled by the composition of the Raman gain medium, the selective reflectivity of reflective elements that define the lasing cavity of the Raman fiber laser 412j, and/or the pump spectrum of the spatially-coherent pump laser beam 410j. For example, the respective pump spectrums of the spatially-coherent pump laser beams 410a-410j may be substantially the same or similar, while the composition of the Raman gain medium and/or the wavelength selectivity of the reflective elements (not shown) of the Raman fiber lasers 412a-412j may be chosen so that the spectrally-consolidated laser beams 414a-414j each exhibit a unique lasing peak wavelength.

The laser system 400 further includes a laser apparatus 403 that may be configured according to any of the laser apparatus embodiments disclosed herein (e.g., the laser apparatus 100). The spectrally-consolidated laser beams 414a-414j may be used as the pumps for the laser apparatus 403. The spectrally-consolidated laser beams 414a-414j may be spectrally combined using an upper-stage spectral beam combiner 416 of the laser apparatus 403 to form a single, upper-stage, substantially spatially-coherent pump laser beam 418. The substantially spatially-coherent pump laser beam 418 may be spectrally consolidated, as previously described, using a Raman fiber laser 420 of the laser apparatus 403 to form a high-powered spectrally-consolidated laser beam 422. However, in some embodiments, the Raman fiber laser 420 may be omitted, and the high-powered substantially spatially-coherent pump laser beam 418 may be employed. Depending on the number of spectrally-consolidated laser beams input into the upper-stage spectral beam combiner 416, the spectrally-combined beam 418 output therefrom may exhibit a white-light spectrum or a white-light like spectrum.

It is noted that the illustrated embodiment shown in FIG. 4 is a simplified two-stage laser system. In other embodiments, three or more stages may be employed to increase the power output of the spectrally-consolidated laser beam 422. For example, referring to FIG. 5, according to another embodiment, a three-stage laser system may be formed when each one of the pumps $404a_1$-$404a_k$ and $404j_1$-$404j_l$ comprises a corresponding laser apparatus (e.g., a laser apparatus 100) configured to output a spectrally-consolidated laser beam from a number of spectrally-distinct pumps (e.g., laser diodes, fiber lasers, or a laser apparatus configured as the laser apparatus shown in FIG. 1). Each one of the pumps $404a_1$-$404a_k$ comprises a corresponding second set of laser apparatuses $500a_1$-$500a_k$ and each one of the pumps $404j_1$-$404j_l$ comprises a corresponding second set of laser apparatuses $500j_1$-$500j_l$. For example, the laser apparatus $500a_1$ includes a plurality of pumps $502a_1$-$502a_m$ (e.g., laser diodes, fiber lasers, or a laser apparatus configured as the laser apparatus shown in FIG. 1), each of which is configured to emit a corresponding pump laser beam $504a_i$-$504a_m$. Each pump laser beam $504a_1$-$504a_m$ of the laser apparatus $500a_1$ has a unique peak wavelength. The laser apparatus $500a_1$ also includes a spectral beam combiner $506a_1$ configured to combine the pump laser beams $504a_1$-$504a_m$ into a single, substantially spatially-coherent pump laser beam $508a_1$. A Raman fiber laser $510a_1$ of the laser apparatus $500a_1$ spectrally consolidates the substantially spatially-coherent pump laser beam $508a_1$ into a spectrally-consolidated laser beam $406a_1$ that serves as one of the pump beams for the laser apparatus 402a.

Figure 5:
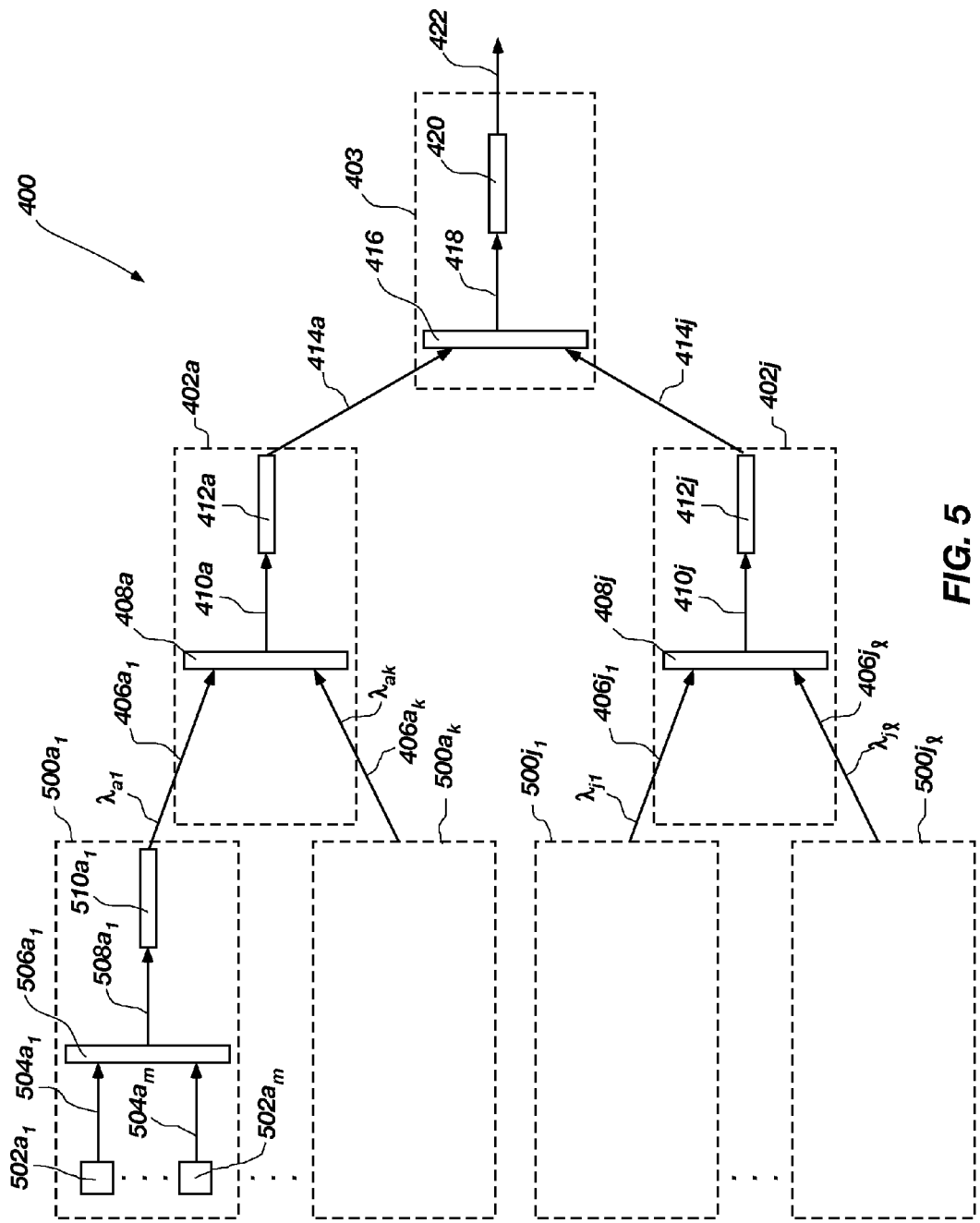
FIG. 5 is a diagrammatic view of an embodiment of the laser system shown in FIG. 4 in which each pump is configured as one of the laser apparatuses shown in FIG. 1 and outputs a spectrally-consolidated laser beam.

Referring still to FIGS. 4 and 5, employing the disclosed laser apparatuses as the basic building blocks in a laser system enables scaling the power of the laser beam output by the laser system. Such systems enable consolidating laser beams emitted from a large number of pumps into a high-power spectrally-consolidated laser beam with a narrow bandwidth and by using a relatively small number of components. For example, the total number of pumps combined into a single beam may be represented by the following equation:

$$\epsilon = \beta^N \quad (1)$$

Where $\epsilon$, is the total number of pumps, $\beta$ is the branching ratio, and N is the number of stages. For example, in the illustrated embodiment shown in FIG. 5, the branching ratio, $\beta$, is two and the number of stages, N, is three.

The number of spectral beam combiners and Raman fiber lasers, respectively, for a certain branching ratio and number of stages can be represented by the following equation:

$$n = 1 + \sum_{j=1}^{N-1} \beta^j \quad (2)$$

For a laser system that includes 27,000 pumps and 30 stages, the number of spectral beam combiners and Raman fiber lasers is each about 930. Thus, a large number of pumps may be employed so that the spectrally-consolidated laser beam (e.g., the beam 422 in FIG. 5) output by the laser system has an enhanced power, while employing a relatively small number of components so that the laser system may still be cost-effective and relatively straight forward to manufacture.

In a power-scaled laser system that employs multiple Raman fiber lasers for spectral consolidation of spectrally-combined pump laser beams, the respective lasing peak wavelength of the spectrally-consolidated laser beams output from Raman fiber lasers may be controlled by proper fabrication of fiber Bragg gratings that may define a lasing cavity of each Raman fiber laser. For example, the fiber Bragg grating of each Raman fiber laser may be formed by exposure to the same ultra-violet interference fringe pattern, while a selective amount of strain is applied to each Raman fiber laser in order to carefully modulate the refractive index of and vary the wavelength selectivity of the fiber Bragg gratings so-formed.

While various aspects and embodiments have been disclosed herein, other aspects and embodiments are contemplated. The various aspects and embodiments disclosed herein are for purposes of illustration and are not intended to be limiting.

The invention claimed is:

1. A laser system, comprising:
   a first set of laser apparatuses, each laser apparatus of the first set including a lasing cavity having a Raman lasing medium positioned therein, each laser apparatus of the first set configured to emit a corresponding spectrally-consolidated laser beam at a unique lasing peak wavelength responsive to the Raman lasing medium thereof absorbing a spectrally-combined, substantially spatially-coherent pump laser beam; and
   a spectral beam combiner configured to combine the corresponding spectrally-consolidated laser beams into an upper-stage substantially spatially-coherent laser beam;
   an additional lasing cavity including an additional lasing medium positioned therein, the additional lasing medium adapted to output an additional spectrally-consolidated laser beam responsive to absorbing the upper stage substantially spatially-coherent laser beam;
   second sets of laser apparatuses, each second set associated with a corresponding one of the laser apparatuses of the first set, each laser apparatus of a corresponding second set configured to emit a corresponding spectrally-consolidated pump laser beam having a unique peak wavelength; and wherein each laser apparatus of the first set includes a corresponding spectral beam combiner configured to combine the corresponding spectrally-consolidated pump laser beams received from the corresponding second set associated therewith into the corresponding spectrally-combined, substantially spatially-coherent pump laser beam.

2. The laser system of claim 1 wherein:

each Raman lasing medium of each laser apparatus of the first set is adapted to generate a plurality of gain spectra responsive to absorbing one of the corresponding spectrally-combined, substantially spatially-coherent pump laser beams, each gain spectrum corresponding to one of the unique peak wavelengths of the one of the corresponding spectrally-combined, substantially spatially-coherent pump laser beams and partially overlapping with all other ones of the gain spectra; and first and second selectively reflective elements spaced from each other to define a lasing cavity including one of the Raman lasing mediums positioned therein, the first and second selectively reflective elements configured to promote emission of one of the corresponding spectrally-consolidated laser beams from the one of the Raman lasing mediums with one of the unique lasing peak wavelengths common to each gain spectrum.

3. The laser system of claim 1 wherein the spectral beam combiner of each laser apparatus of the first set comprises a diffractive element configured to combine the corresponding spectrally-consolidated pump laser beams into one of the corresponding spectrally-combined, substantially spatially-coherent pump laser beams.

4. The laser system of claim 1 wherein the spectral beam combiner of each laser apparatus of the first set comprises a refractive element configured to combine the corresponding spectrally-consolidated pump laser beams into one of the corresponding spectrally-combined, substantially spatially-coherent pump laser beams.

5. The laser system of claim 1 wherein the Raman lasing medium of each laser apparatus of the first set comprises an optical fiber including the first and second selectively reflective elements that define the lasing cavity.

6. A method, comprising:

forming a plurality of spectrally-combined, substantially spatially-coherent pump laser beams by spectrally combining a plurality of spectrally-consolidated laser beams;

outputting the plurality of spectrally-combined, substantially spatially-coherent pump laser beams;

absorbing each of the plurality of spectrally-combined, substantially spatially-coherent pump laser beam with a corresponding Raman lasing medium positioned in a corresponding lasing cavity;

outputting a respective spectrally-consolidated laser beam with a unique peak wavelength from each Raman lasing medium responsive to the act of absorbing;

spectrally combining the respective spectrally-consolidated laser beams into an additional substantially spatially-coherent laser beam;

inputting the additional substantially spatially-coherent laser beam into an additional lasing medium positioned in an additional lasing cavity; and outputting an additional spectrally-consolidated laser beam from the additional lasing medium responsive to the act of inputting the additional substantially spatially-coherent laser beam.

7. A laser system, comprising:

a plurality of pumps, each pump configured to emit a corresponding spectrally-consolidated pump laser beam having a unique peak wavelength;

a plurality of laser apparatuses, each laser apparatus including:

a spectral beam combiner configured to combine two or more of the corresponding spectrally-consolidated pump laser beams into a substantially spatially-coherent pump laser beam having a pump spectrum that includes the unique peak wavelengths; and first and second selectively reflective elements spaced from each other to define a lasing cavity including a Raman lasing medium positioned therein, the Raman lasing medium generating a plurality of gain spectra responsive to absorbing the substantially spatially-coherent pump laser beam, each gain spectrum corresponding to a respective one of the unique peak wavelengths of the substantially spatially-coherent pump laser beam and partially overlapping with all other ones of the gain spectra, the first and second selectively reflective elements configured to promote emission of a corresponding spectrally-consolidated laser beam from the Raman lasing medium with a lasing peak wavelength common to each gain spectrum;

an additional spectral beam combiner configured to combine the corresponding spectrally-consolidated laser beams from two or more of the plurality of laser apparatuses into an upper-stage substantially spatially-coherent laser beam; and an additional lasing cavity including an additional Raman lasing medium positioned therein, the additional lasing medium adapted to output an additional spectrally-consolidated laser beam responsive to absorbing the upper stage substantially spatially-coherent laser beam.

8. The laser system of claim 7 wherein the spectral beam combiner of each laser apparatus comprises a diffractive element configured to combine the two or more of the corresponding spectrally-consolidated pump laser beams into the substantially spatially-coherent pump laser beam.

9. The laser system of claim 8 wherein the diffractive element comprises a diffraction grating.

10. The laser system of claim 7 wherein the spectral beam combiner of each laser apparatus comprises a refractive element configured to combine the two or more of the corresponding spectrally-consolidated pump laser beams into the substantially spatially-coherent pump laser beam.

11. The laser system of claim 10 wherein the refractive element comprises a prism.

12. The laser system of claim 7 wherein the spectral beam combiner of each laser apparatus comprises at least one of a diffractive element or a refractive element configured to combine the two or more of the corresponding spectrally-consolidated pump laser beams into the substantially spatially-coherent pump laser beam.

13. The laser system of claim 7 wherein the Raman lasing medium of each laser apparatus comprises an optical fiber including the first and second selectively reflective elements that define the lasing cavity, the first and second selectively reflective elements being at least partially reflective to electromagnetic radiation at the lasing peak wavelength.

14. The laser system of claim 13 wherein each of the first and second selectively reflective elements comprises a fiber Bragg grating.

15. The laser system of claim 7 wherein the Raman lasing medium of each laser apparatus comprises a bulk Raman lasing medium.

16. The laser system of claim 7 wherein the Raman lasing medium of each laser apparatus forms at least part of an optical waveguide.

17. The laser system of claim 1 wherein the Raman lasing medium of each laser apparatus of the first set comprises a bulk Raman lasing medium.

18. The laser system of claim 1 wherein the Raman lasing medium of each laser apparatus of the first set forms at least part of an optical waveguide.

19. The laser system of claim 1 wherein the Raman lasing medium of each laser apparatus of the first set forms at least part of an optical fiber.

* * * * *